Figure 1:
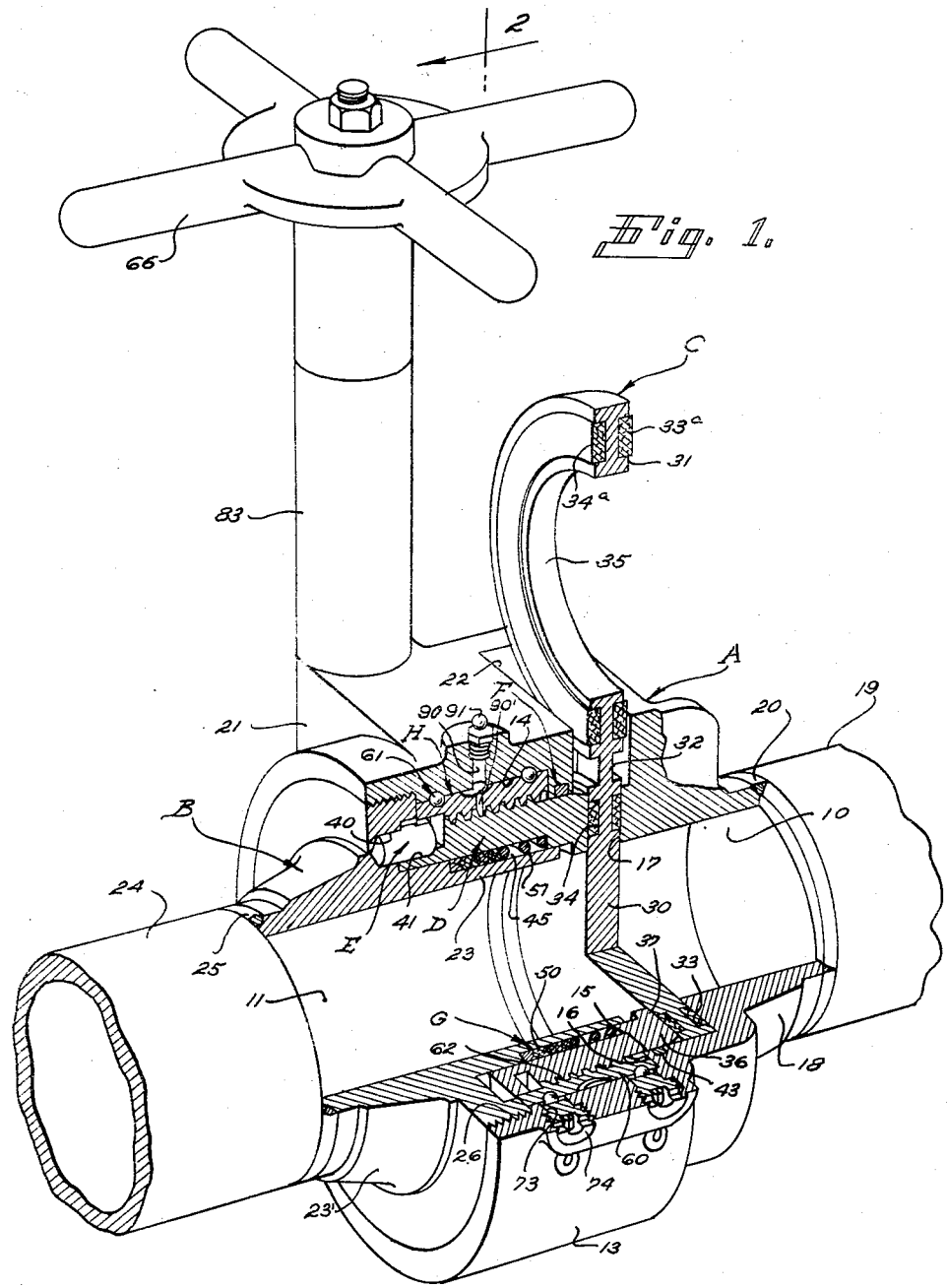

June 26, 1951

L. S. HAMER 2,558,247

FLOW CONTROL FITTING

Filed July 26, 1948

2 Sheets-Sheet 1

Inventor
Leland S. Hamer
By
[signature]
Attorney

June 26, 1951  L. S. HAMER  2,558,247
FLOW CONTROL FITTING
Filed July 26, 1948  2 Sheets-Sheet 2
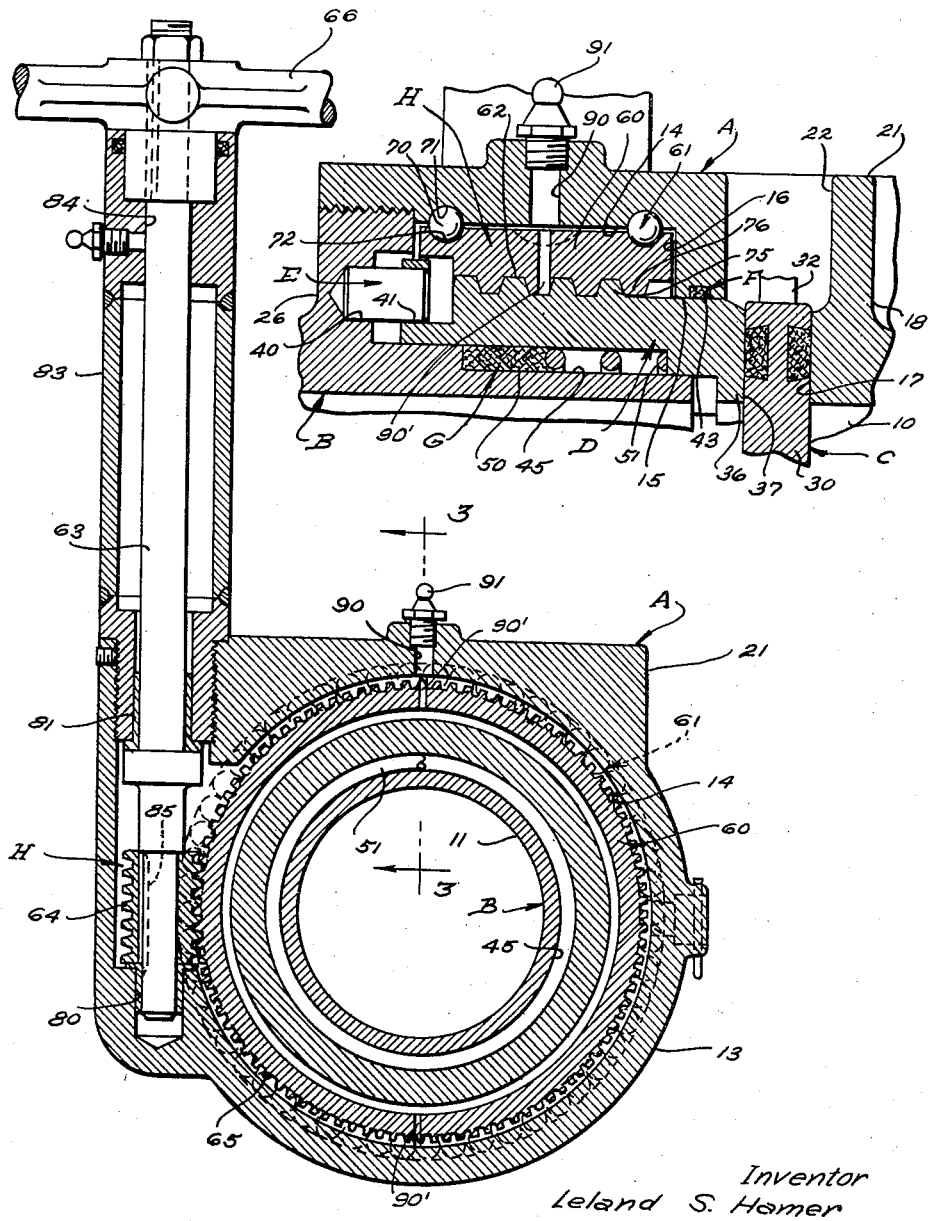
Inventor
Leland S. Hamer
By
Attorney Patented June 26, 1951

2,558,247

UNITED STATES PATENT OFFICE 2,558,247

FLOW CONTROL FITTING

Leland S. Hamer, Long Beach, Calif., assignor of one-fourth to Paul A. Dewhirst, Los Angeles, Calif.

Application July 26, 1948, Serial No. 40,781

10 Claims. (Cl. 251—167)

This invention has to do with a flow control fitting, it being a primary object of the present invention to provide a fitting including a flow control plate as, for instance, a line blinding plate, or the like, and having a body which is rigid so that the coupling parts at the ends thereof are maintained in fixed relation at all times during operation of the fitting.

Flow control devices or line blind fittings are used extensively in pipe lines, and the like, and it is characteristic of most such fittings that operation thereof results in variation in the overall length or size of the fitting. For example, the usual flow control or line blind fitting incorporated in a pipe line requires some flexibility in the pipe line to allow for proper operation of the fitting since the body of the fitting is made up of sections which shift relative to each other in an axial direction as the fitting operates.

There are many situations where the piping is such that it is rigid or where a rigid structure is desired and, therefore, the ordinary line blind fitting is not practical or applicable.

It is a general object of this invention to provide a line blind fitting suitable for insertion in or application to a pipe line and having a body which is rigid or fixed as to axial length, so that the fitting acts effectively in the pipe line and can be operated at will without movement of flexure of parts of the line.

Another object of the present invention is to provide a line blind fitting of the general character referred to wherein the body of the fitting which is incorporated in the pipe line has coupling parts at its ends which remain fixed relative to each other, the body being of sectional construction with one coupling part on one section and the other coupling part on another section.

A further object of the invention is to provide a fitting of the general character referred to wherein rigidly connected body sections establish a chamber in which a clamp sleeve operates to clamp a flow control plate against a fixed shoulder in the body.

A further object of the invention is to provide a fitting of the character referred to including effective sealing means engaging the clamp sleeve to prevent leakage past or around the sleeve.

Another object of the present invention is to provide a fitting of the general character referred to wherein there is a simple, effective, and dependable operating means for the clamp sleeve. The structure provided by the present invention includes a rotatable ring mounted in the body through anti-friction bearing means, the ring being threaded to the clamp sleeve and being operated by a gear, preferably a worm gear.

The various objects and features of my invention will be fully understood from the following detailed description of a typical preferred form and application of the invention, throughout which description reference is made to the accompanying drawings, in which:

Fig. 1 is a perspective view of a fitting embodying the present invention showing it secured in a pipe line or between aligned pipe sections and showing a segment or quarter of the structure removed or broken away to illustrate the details of construction. Fig. 2 is a vertical detailed sectional view of the structure shown in Fig. 1, being a view taken in the direction indicated by line 2—2 on Fig. 1, and Fig. 3 is an enlarged detailed sectional view taken as indicated by line 3—3 on Fig. 2.

The fitting provided by the present invention involves, generally, a sectional body including a main or outer section A and an inner section B, a flow control or spectacle plate C received in the body, a clamp member or sleeve D carried in the body and including an end portion engageable with the plate, a key E keying the body and sleeve together against relative rotation but permitting axial movement of said sleeve within said body, sealing means F between the exterior of the sleeve and the body, and means H acting to shift the sleeve axially within said body.

The body sections A and B are separable, being joined or connected by a means such as a threaded connection which allows for ready separation yet holds the sections rigid relative to each other under normal conditions. In the particular case illustrated, the sections are joined by a threaded connection so that the flow passage 10 through section A registers with, or is in alignment with the flow passage 11 in section B.

The outer section A of the body, which, for the purpose of the present specification and claims, will be referred to as the forward end of the fitting, has a large or main portion 13 within which is a central socket 14, the forward or bottom end of which socket is defined by a radial wall 16. A counterbore 15 is provided in the section A and extends from the wall 16 toward the forward end of the fitting. A radially disposed, annular shoulder 17 occurs, or is formed, within section A and surrounds the flow opening or passage 10 of forward section A. The forward end portion 18 of section A is considerably smaller in diameter than the main portion 13 of said section and projects forwardly to form a connecting or coupling part by which section A is joined to a pipe section 19 or the like. In practice, the coupling portion 18 of section A may be formed or fitted in any suitable manner for making any suitable connection with a pipe or the like. In the case illustrated, the portion 18 is shown secured to the pipe section 19 by welding 20.

An enlargement or boss 21 is provided at the upper side of the main body portion 13 of section A of the fitting, and a radially disposed access opening 22 enters the body from the top of the boss 21 providing a radially disposed opening or passage into the body, making the annular, radially disposed shoulder 17 accessible to the forward face of control plate C. In the particular case illustrated, the opening 22 is vertically disposed, and the enlargement 21 in which the opening 22 occurs is at the top of the body section A forming a well for holding fluid that might otherwise spill from the structure in the course of changing or operating the control plate C.

The inner section B of the body, which, for the purpose of the present specification and claims, will be referred to as the rear end of the fitting, is a simple, straight tubular part with a forward end portion 23 extending into the socket 14 of section A with substantial clearance, and terminating short of the shoulder 17. The rear section B of the fitting has a rear end portion 23' projecting from the fitting at the end opposite the projection 18 of the forward section A, said end portion 23' and serving as a means by which the rear end of the fitting may be connected to a pipe section 24, or the like. Like forward projection 18, the rear end portion 23' may be provided with any suitable means for making connection with a pipe or the like. In the case illustrated, welding 25 serves to connect the pipe section 24 to the rear end portion 23.

Section B further includes a middle or intermediate, outwardly extending, radial flange portion 26, the peripheral face of which is externally threaded and is engaged in the rear end portion of the socket 14 in section A, into which end portion it is threaded to provide the desired connection between the sections A and B.

The flow control or spectacle plate C may be of any suitable form or type as circumstances require. In the drawings, I have illustrated a simple or typical type of plate having a solid end 30 joined to an apertured end 31 by connecting neck 32. The solid or plate end 30 is large enough to close the opening 10 and overlap the annular, radially disposed shoulder 17 in the body section A and carries on its forward face a packing ring 33 to effect a suitable seal with said shoulder. A second packing ring 34 is carried at the opposite or rear face of the plate end 30 to effect a suitable seal with the forward end of clamp sleeve D as shown in Figs. 1 and 3 of the drawings. It is to be observed that the apertured portion 31 of the plate C has an opening 35 through it corresponding in diameter with the diameter of flow passage 10 and said portion 31 carries packing rings 33$^a$ and 34$^a$ corresponding to the rings 33 and 34, respectively, of solid plate end 30.

The clamp member or sleeve D is mounted for limited, axial movement within the socket 14 formed in the body section A. The clamp sleeve D is arranged to surround the forward end portion 23 of section B on which portion it is shiftable axially, and said sleeve is provided at its forward end with an inwardly projecting head 36 that enters, and is preferably slidably supported in the counterbore 15. The head 36 has an annular, radially disposed face 37 opposing and movable toward and from the shoulder 17 and spaced therefrom a sufficient distance to admit the plate C between the shoulder 17 and the face 37 of clamp sleeve D, as shown in Figs. 1 and 3 of the drawings.

The key E acts between the forward face of flange 26 of section B and the rear end of the sleeve D to hold these parts against relative rotation when the sections are assembled. In the particular form of the invention illustrated, the key E is carried in registering openings 40 and 41 provided in the forward face of flange 26 and the rear end of sleeve D, respectively. It will be apparent how the pin E, being engaged in the openings 40 and 41 in the parts to be keyed together, positively prevents relative rotation between these parts, at the same time allowing the sleeve D to shift freely in an axial direction so that the forward face 37 of the head 36 may be moved into clamping engagement with the plate C to clamp the plate against said shoulder 17.

The sealing means F which provides a seal between the exterior of the sleeve D and the body section A, preferably involves a packing ring 43 acting between the periphery of said sleeve and the inner wall defining the counterbore 15. In the case illustrated, the inner wall is shown channeled or grooved to carry the packing ring 43 so that said ring engages the exterior of the head.

The sealing means G which provides a seal between the outer, straight, tubular, end portion 23 of body section B and the inner, straight surface of the sleeve D, is carried in a recess 45 formed or provided on the end portion 23 between the inner, straight surface of sleeve D and the exterior of the said portion 23 of section B. The packing G preferably involves a plurality of packing rings 50 of the chevron type and a helical spring 51 under compression and engaging the packing rings 50 to hold them tight so that a sealing engagement is maintained between the inner surface of sleeve D and the said portion 23 of body section B.

The means H acting to shift the sleeve D axially involves, generally, a ring 60 which surrounds the sleeve D and is located within the socket 14 within section A, anti-friction means 61 rotatably supporting said ring in the body section A, threaded engagement 62 between said sleeve and said ring and a drive for said ring including a shaft 63, a gear 64 on the shaft 63 and engaged with teeth 65 on the ring 60, and an operating wheel 66 on the shaft at the exterior of the body section A.

The ring 60 is located entirely within the socket 14 and surrounds the sleeve D, said ring being confined between the wall 16 which defines the forward end of the socket 14 and the forward face of flange 26 of section A so that said ring is held against axial movement.

The antifriction means 61 rotatably supports the ring 60 in the socket 14 and, in the preferred form of the invention, said antifriction means involves a plurality of balls 70 carried in registering grooves or races 71 and 72 in the adjacent faces of the wall of section A which defines the socket 14 and the outer surface of ring 60, respectively. Suitable access openings 73 are provided for admitting the balls into the grooves, the openings 73 being normally closed by removable plugs or closures 74.

The threaded engagement 62 between the outer surface of sleeve D and the inner surface of the surrounding ring 60, preferably involves a heavy or coarse thread 75 on the exterior of the sleeve, meshing with a corresponding thread 76 on the interior of the ring.

The shaft 63 of the drive provided for the ring 60, is carried by the body section A to project therefrom so that its operating part or hand wheel 66 is at the exterior of said body section convenient for operation. In the case illustrated, the shaft 63 is carried by the body section A being shown carried by bearings 80 and 81 supported by the body section A, as clearly illustrated in Fig. 2 of the drawings. In the particular case illustrated, an extension 83 of the body section A projects a substantial distance from the other parts of said body section and carries a bearing 84 to carry the projecting end portion of shaft 63. The shaft 63 projects beyond extension 83, and the wheel 66 is on the projecting end portion of the shaft.

The gear 64 for driving the ring 60 is preferably a worm gear fixed on the shaft 63, as by means of a key 85 or the like. The parts are arranged and related so that the worm gear meshes with suitably formed teeth 65 on the exterior of the ring 60.

Through the construction just described, rotation of the shaft 63, as by operation of the hand wheel 66, operates gear 64 which in turn acts on the teeth 65, causing rotation of the ring 60. As the ring 60 rotates, the threaded engagement between said ring and the sleeve D causes said sleeve to shift axially. It will be immediately apparent that a very substantial mechanical advantage is gained between the hand wheel 66 and the sleeve D, the forward end face of which sleeve clamps the plate C against the face of shoulder 17. Consequently, it is simple for the operator to operate the device to establish a seal that is effective even as against high pressures.

In the preferred form of the invention a radial access opening 90 is provided through the wall of body section A adapted to communicate with circumferentially spaced radial openings 90' formed through ring 60 so that suitable lubricant can be admitted through a lubricant fitting 91. It is desirable to introduce a suitable lubricant into the socket 14 so that the antifriction means 61, the threads 75 and 76, and in fact, all of the working or relatively moving parts of the fitting are lubricated, making the device free in operation.

From the foregoing description it will be noted that the fitting provided by the present invention is rigid, and it will be apparent how the mechanism may be operated to clamp or release the plate C at will without in any way varying the axial length of the fitting, that is, without shifting the body sections A and B relative to each other, and, consequently, the coupling portions of the body sections A and B always remain in predetermined fixed relation.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A flow control fitting of the character described having an axial flow passage therethrough and including a tubular body section having an axially extending socket therein which terminates at its forward end in a radial, inwardly extending apertured wall forming a stop shoulder; a second tubular body section within said first mentioned body section and having an outwardly extending radial flange portion closing the rear end of the socket in said first mentioned body section, the forward face of said flange portion constituting a rear stop shoulder spaced from the stop shoulder in the first mentioned body section, said first mentioned body section having an annular radially disposed plate shoulder thereon facing toward the rear of the fitting and accessible through a lateral opening in said body section and through the apertured wall of said socket; a plate entered through the lateral opening with its forward face engaging the annular plate shoulder; a sleeve surrounded by the wall defining said socket in the first mentioned body section shiftable axially within said socket and through said apertured wall and having its forward end in axial alignment with and opposing said plate shoulder; and means operating said sleeve to cause its forward end to engage the rear face of said plate to clamp the plate to said plate shoulder including a ring surrounded by the wall defining said socket and confined against axial movement between the stop shoulders of the two body sections, said ring surrounding and being threaded to the exterior of said sleeve, and gear means at the exterior of the ring and driving the ring to effect axial movement of said sleeve.

2. A flow control fitting as defined in claim 1 and including anti-friction means disposed between the outer circumference of said ring and the inner circumference of the wall defining said socket in said first mentioned body section, said anti-friction means rotatably supporting said ring.

3. A flow control fitting as defined in claim 2 in which the anti-friction means includes bearings disposed in registering grooves in the outer circumference of the ring and the inner circumference of the wall defining said socket, and in which access openings are provided for introducing said bearings into said registering grooves.

4. A flow control fitting as defined in claim 1 and including gear means carried by the first mentioned body section and extending into the socket in said section, gear means on the outer circumference of said ring, said gear means meshing, and said first mentioned gear means including an operating part accessible at the exterior of the fitting to effect rotation of said ring and axial movement of said sleeve.

5. A flow control fitting as defined in claim 1 including a worm gear carried by the first mentioned body section and extending into the socket in said section, a worm gear on the outer circumference of said ring, said worm gears meshing, and a shaft mounted on said first mentioned body section and keyed to said first mentioned worm gear and operable from the exterior of the fitting to effect rotation of said ring and axial movement of said sleeve.

6. A flow control fitting as defined in claim 1 and including a key extending between, and engaged in openings in, the second tubular body section and said sleeve for holding said body section and sleeve against relative rotation but permitting axial sliding movement of said sleeve with respect to said second tubular body section.

7. A flow control fitting as defined in claim 1 in which the first mentioned tubular body section has a tubular pipe receiving portion at its forward end, and in which the second mentioned tubular body section has a tubular pipe receiving portion at its rear end, whereby said fitting may be connected in a pipe line.

8. A flow control fitting of the character described having an axial flow passage therethrough and including a tubular body section having an axially extending socket therein and having a plate chamber in communication with said socket, there being an annular, radially disposed plate shoulder in said plate chamber facing toward the rear of the fitting and accessible through a lateral opening in said body section and through said plate chamber, the body section having a radial, inwardly extending apertured wall defining the forward end of said socket and constituting a stop shoulder facing toward the rear of the fitting; a second tubular body section within said first mentioned body section including a wall for closing the rear end of the socket and having an axially extending wall portion extending toward the forward end of the fitting, said wall which closes the rear end of said socket forming a second stop shoulder spaced from the stop shoulder in the first mentioned body section and facing toward the forward end of the fitting; a plate entered through said lateral opening in the first section and into the plate chamber with its forward face engaging the annular plate shoulder; a sleeve surrounded by the wall defining said socket in the first mentioned body section and surrounding the axially extending wall portion of said second tubular body section and axially movable on said last mentioned wall and through said apertured wall and having its forward end in said plate chamber and in axial alignment with and opposing the plate shoulder therein; and means operating said sleeve to cause its forward end to engage the rear face of said plate to clamp the plate to said plate shoulder including a ring in said socket surrounding and rotatably threaded to said sleeve and confined against axial movement between the stop shoulders in the two body sections, and gear means driving said ring to effect axial movement of said sleeve.

9. A flow control fitting as defined in claim 8 in which packing means are interposed between the inner surface of said sleeve and the outer surface of said axially extending wall portion of said second body section surrounded by said sleeve, and between the periphery of said sleeve and the inner surface of said first mentioned body section.

10. A flow control fitting as defined in claim 8 in which said first mentioned packing means comprises an annular packing ring disposed in an axially extending chamber between said inner surface of said sleeve and said outer surface of said axially extending wall portion, and in which a compression spring is disposed axially within said last mentioned chamber and acts between said packing ring and an end wall of said last mentioned chamber to compress said packing.

LELAND S. HAMER.

REFERENCES CITED

The following references are of record in the file of this patent:

UNITED STATES PATENTS

| Number | Name | Date |
| --- | --- | --- |
| 1,599,168 | Duncan | Sept. 7, 1926 |
| 1,931,797 | Howard | Oct. 24, 1933 |
| 1,938,460 | Muff | Dec. 5, 1933 |
| 2,030,458 | McKellar | Feb. 11, 1936 |
| 2,214,959 | Hamer | Sept. 17, 1940 |
| 2,270,019 | Fawick | Jan. 13, 1942 |